United States Patent [19]
Pallari

[11] 3,814,152

[45] June 4, 1974

[54] STUMP PULLING AND CRUSHING DEVICE

[76] Inventor: Kyösti Pallari, 95385 Tervola, Finland

[22] Filed: Sept. 22, 1972

[21] Appl. No.: 291,351

[30] Foreign Application Priority Data
Sept. 24, 1971 Finland .............................. 2676/71

[52] U.S. Cl. ............. 144/2 N, 144/193 A, 144/34 E
[51] Int. Cl. ................................................ B27c 9/00
[58] Field of Search ........ 144/2 R, 2 N, 34 R, 34 A, 144/34 E, 193 R, 193 A, 309 AC

[56] References Cited
UNITED STATES PATENTS

| R23,895 | 1/1951 | Winger | 144/34 A |
|---|---|---|---|
| 2,966,180 | 12/1960 | Bles | 144/193 R |
| 3,482,614 | 12/1969 | Jordan et al. | 144/34 E |
| 3,710,834 | 1/1973 | Jarck | 144/309 AC |
| 3,719,314 | 3/1973 | Cox | 144/34 E X |
| 3,626,477 | 12/1971 | Fulghum, Jr. | 144/34 E |

FOREIGN PATENTS OR APPLICATIONS

| 138,110 | 10/1961 | U.S.S.R. | 144/34 E |

*Primary Examiner*—Andrew R. Juhasz
*Assistant Examiner*—W. D. Bray
*Attorney, Agent, or Firm*—Scrivener Parker Scrivener and Clarke

[57] ABSTRACT

Apparatus for the combined removal and crushing of tree stumps which is adapted to be attached to the jib of a work machine, said apparatus including a downwardly extending hook for stump removal, rearwardly extending arms for supporting the removed stump, the arms being spaced apart to provide a gap between and a rotatable cutting blade aligned with the gap and arranged to split the supported stump.

5 Claims, 3 Drawing Figures

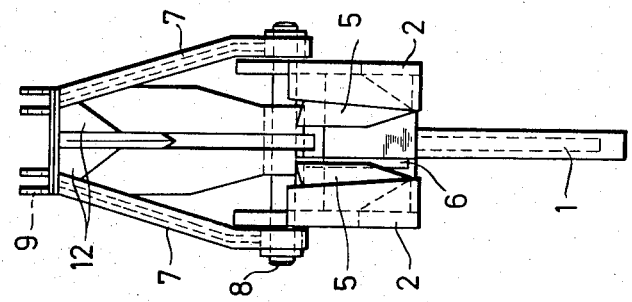
Fig.2
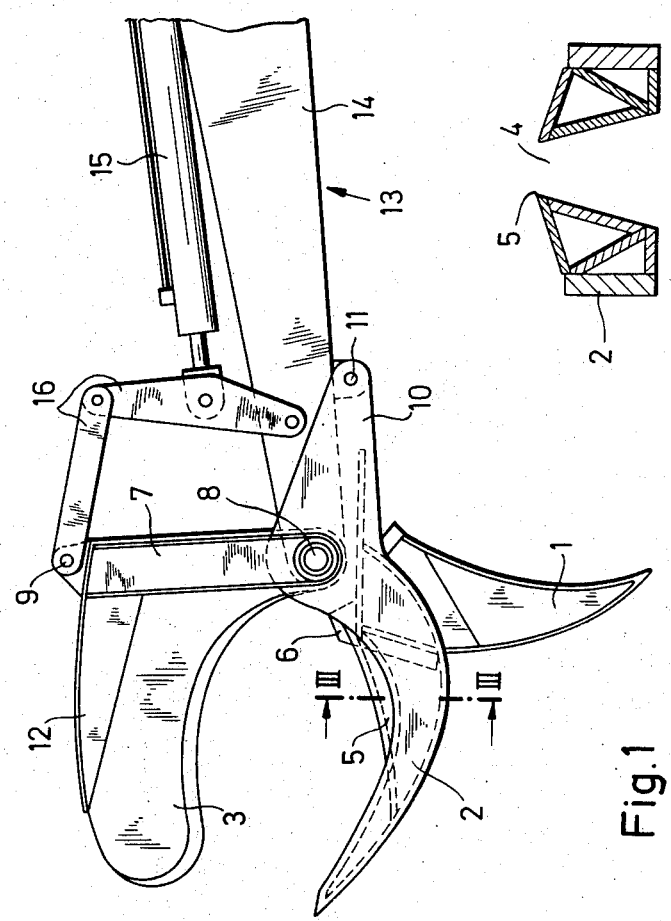
Fig.3
Fig.1

STUMP PULLING AND CRUSHING DEVICE

The present invention concerns a stump pulling and crushing device intended for attachment to the jib of a work machine, in particular an excavating machine, provided with a hydraulic piston cylinder device.

As it has become an increasingly common practice to use tree stumps for raw material in cellulose manufacturing, it has also become necessary to develop an apparatus by the aid of which the pulling, dressing and crushing of stumps can be accomplished as rapidly and efficiently as possible. However, no such device has existed so far, and the aim of the invention is therefore to eliminate this drawback.

The stump pulling and crushing device according to the invention is mainly characterized by the characteristic features specified in the attached claim 1.

In the following, the invention and tee advantages gained with its aid have been more closely described with reference to the attached drawings, wherein FIG. 1 shows in elevational view a device according to the invention, attached to the scoop arm of an excavating machine.

FIG. 2 shows the same, viewed from the side facing away from the excavating machine.

FIG. 3 shows the section along the line III—III in FIG. 1.

The principal components of the stump pulling and crushing device according to the most favourable embodiment of the invention, shown in the drawing, are: a downwardly pointing stump hook 1, arms 2 projecting backwardly from its upper part and which are intended to support the stump, and a cutting blade 3 rotatably attached to these arms. It is thus understood that the parts 1 and 2 constitute a rigid unit, while the cutting blade is rotatable with reference to them. Between the supporting arms 2 a gap 4 on the order of about 10 cm width is left, towards which the cutting blade 3 may swivel about the axle pin 8. As will be described in greater detail later, the stump which has been pulled out by the aid of the stump hook 1 at the first stage is transferred at the next stage to rest upon the supporting arms 2, whereupon the hydraulic piston cylinder device 15 of the work machine to which the device has been attached is employed to press the blade against the stump so that the stump is split. In order to promote the action of the blade 3, on the inside of one or both supporting arms 2 counter-cutting blades 5 have been formed, between which the blade 3 can enter. In order to prevent the stumps from becoming wedged in the narrow throat between the blade 3 and the counter-cutting blades 5, adjacent to the axle 8, a counterblade 6 has been provided between the arms 2 5, with which counterblade the cutting blade 3 cooperates when pushed into its extreme position between the supporting arms 2. Furthermore, in order to prevent said impaction and to fling the stump halves efficiently in both lateral directions, the upper part of the blade 3 has been provided with a, most appropriately V-shaped, extension providing laterally extending wings 12.

The stump pulling and crushing device according to the invention is most appropriately attached to the scoop arm 14 of the excavating machine, supported by the axle pin 8 of the blade 3. For the purpose of turning the cutting blade 3, its base side has been shaped so as to form a long lever arm 7, the lower end of which is rotatably carried by the axle pin 8 substantially adjacent to the stump hook 1. The upper end of the lever arm 7 in its turn is connected by a pivot 9 and with the aid of linkeages 16 belonging to the scoop turning mechanism of the excavating machine, with the hydraulic piston cylinder device 15. by means of which the cutting blade 3 can be turned to and fro. In order to brace the stump hook 1 and the supporting arms 2 against turning on the scoop arm 14, extensions 10 for the arms 2, projecting along the scoop arm, have been formed and through which passes a pin 11 securing them to the scoop arm 14. When a stump is being pulled out, suitable motions of the scoop arm 14 are produced to introduce the stump hook 1 behind the stump. Thanks to the mutual position and shape of the stump hook 1 and arms 2, which can be seen from FIG. 1, the stump hook 1 can be pushed substantially in under the stump, whereby the arm 14 will be nearly vertical. In the stump detaching operation the movements both of the jib assembly 13 and of the excavator as a whole may be utilized.

The next step in the operation is to crush the detached stump. To accomplish this, the arms 2 are pushed in under the stump by shifting the excavator and/or swivelling the jib assembly 13. After the detached stump has been picked up on the supporting arms 2, it is lifted up by means of the jib assembly 13 and the same time pressure is applied with the blade 3. The pushing force of the hydraulic piston cylinder device 15 may be, for instance, about 20 tons, wherby cleavage even of a tough stump is easily effected. Owing to the violent movements involved in handling the stump when it is lifted up into the air and once more, after having been cleft, falls down on the ground, efficient cleaning of the stumps takes place at the same time.

In the drawing and in the above description merely one favourable embodiment of the invention has been disclosed. Within the scope of the fundamental idea of the invention, numerous modifications are possible as encompassed by the claims following hereinbelow.

I claim:

1. A stump pulling and crushing device for attachment to the jib of a work machine provided with a hydraulic piston cylinder device comprising a downwardly extending hook for stump removal, a pair of rearwardly extending arms for supporting the removed stump, said arms being spaced apart to provide a gap therebetween, a main cutting blade rotatably mounted on the jib and connected with the hydraulic piston cylinder device, said blade being substantially aligned with said gap for movement toward the supported stump for splitting the stump, and each of said arms being provided with a counter-cutting blade for cooperation with said main blade.

2. A device as set forth in claim 1 wherein the main cutting blade is provided with a lever arm, an axle carried by the jib for ratatably supporting the lever arm at one end thereof and means connecting the other end of the lever with the hydraulic piston cylinder device.

3. A device as set forth in claim 2 wherein the rearwardly extending arms are rigidly connected together and are provided with extensions secured to the jib.

4. A device as set forth in claim 1 wherein the upper portion of the main cutting blade is provided with an extension having laterally extending wings.

5. A device as set forth in claim 1 which includes a counterblade carried by said arms for cooperating with said main cutting blade to prevent a stump from becoming wedged in said gap.

* * * * *